(12) United States Patent
Unnikrishnan et al.

(10) Patent No.: US 8,224,804 B2
(45) Date of Patent: Jul. 17, 2012

(54) INDEXING OF PARTITIONED EXTERNAL DATA SOURCES

(75) Inventors: Umesh Unnikrishnan, Sammamish, WA (US); Jason M. Cahill, Woodinville, WA (US); Titus C. Miron, Seattle, WA (US); Zachary Rosenfield, Seattle, WA (US); William D. Taylor, Redmond, WA (US); Brian P. Robbins, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 411 days.

(21) Appl. No.: 12/507,738

(22) Filed: Jul. 22, 2009

(65) Prior Publication Data

US 2011/0022582 A1    Jan. 27, 2011

(51) Int. Cl.
*G06F 17/00* (2006.01)
(52) U.S. Cl. ...................................................... 707/711
(58) Field of Classification Search .................. 707/737, 707/711
See application file for complete search history.

(56) References Cited

U.S. PATENT DOCUMENTS

| | | | |
|---|---|---|---|
| 7,181,438 B1 | 2/2007 | Szabo | |
| 7,293,016 B1 * | 11/2007 | Shakib et al. ......................... | 1/1 |
| 7,461,170 B1 | 12/2008 | Taylor | |
| 7,533,141 B2 | 5/2009 | Nadgir | |
| 2006/0041661 A1 | 2/2006 | Erikson | |
| 2008/0005086 A1 | 1/2008 | Moore | |
| 2008/0033934 A1 * | 2/2008 | Richards et al. ................... | 707/5 |
| 2011/0225165 A1 * | 9/2011 | Burstein ....................... | 707/741 |

OTHER PUBLICATIONS

Bizer et al., "How to publish Linked Data on the Web," accessed on May 13, 2009, accessed at: http://www4.wiwiss.fu-berlin.de/bizer/pub/LinkedDataTutorial/, 35 pages.
Golbeck et al., "Organization and Structure of Information using Semantic Web Technologies," accessed on May 13, 2009, accessed at http://www.ists.pwr.wroc.pl/~krzysiek/sinf2/handbook.pdf, 30 pages.
Gomes et al., "The Viúva Negra Crawler: An Experience Report," copyright © 2007, John Wiley & Sons, L td., http://xldb.fc.ul.pt/daniel/docs/papers/gomesVNcrawlerSpe.pdf, 28 pages.
Harth et al., "SWSE: Answers before Links!," accessed on May 13, 2009, accessed at http://ftp.informatik.rwth-aachen.de/Publications/CEUR-WS/Vol-295/paper18.pdf, 8 pages.
Juffinger et al., "Distributed Web2.0 Crawling for Ontology Evolution," IEEE Xplore, copyright © 2007, http://ieeexplore.ieee.org/stamp/stamp.jsp?tp=&arnumber=4444293&isnumber=4444274, 6 pages.

* cited by examiner

*Primary Examiner* — Charles Kim
*Assistant Examiner* — Kurt Mueller
(74) *Attorney, Agent, or Firm* — Merchant & Gould (57) ABSTRACT

A computing system hosts a plurality of websites, a plurality of external data sources, and a search service. External resources in each of the external data sources are partitioned among a plurality of external partitions. The search service automatically generates an index comprising index entries. The index entries are partitioned among a plurality of index partitions, each associated with one or more of the websites. For each given index partition, the index entries in the given index partition map terms to resources in the given set of resources that contain the terms. The given set of resources includes web pages in a given set of websites associated with the given index partition and external resources in external partitions used by the given set of websites. The search service uses the index entries in given index partition to identify resources in the given set of resources containing query terms.

20 Claims, 4 Drawing Sheets

INDEXING OF PARTITIONED EXTERNAL DATA SOURCES

BACKGROUND

As information technology (IT) has grown more complex, some enterprises have found that the cost of maintaining their own IT infrastructure is too high. To reduce expenses associated with maintaining their information technology infrastructure, such enterprises are shifting to a hosted computing model. In a hosted computing model, a web services provider operates IT infrastructure on behalf of multiple enterprises. In other words, the task of maintaining IT infrastructure is outsourced to the web services provider. The enterprises that use IT infrastructure operated by the web services provider are referred to as tenants.

Tenants may use the IT infrastructure operated by the web services provider for a variety of purposes. For example, tenants may use the IT infrastructure operated by the web service provider to host websites. In a second example, tenants may use the IT infrastructure operated by the third party to host databases.

A web services provider may be required to store a large amount of data for each tenant of the web services provider. For instances, a web services provider may be required to store inventory data for each tenant of the web services provider. Furthermore, a web services provider may be required to store the data for tenants in such a way that each tenant only has access to their own data. That is, the web services provider cannot allow a first tenant to have access to a second tenant's data without the second tenant's permission. At the same time, due to the computational overhead associated with maintaining separate databases, it may not be efficient for the web services provider to store each of the tenants' data in separate databases.

SUMMARY

A computing system hosts a plurality of websites, a plurality of external data sources, and a search service. External resources in each of the external data sources are partitioned among a plurality of external partitions. The search service automatically generates an index comprising index entries. The index entries are partitioned among a plurality of index partitions, each associated with one or more of the websites. For each given index partition, the index entries in a given index partition map terms in a given set of resources to resources in the given set of resources. The given set of resources includes web pages in a given set of websites associated with the given index partition and external resources in external partitions used by the given set of websites. The search service uses the index entries in the given index partition to identify resources in the given set of resources containing query terms.

This summary is provided to introduce a selection of concepts in a simplified form. These concepts are further described below in the Detailed Description. This summary is not intended to identify key features or essential features of the claimed subject matter, nor is this summary intended as an aid in determining the scope of the claimed subject matter.

DETAILED DESCRIPTION

As briefly described above, a system for indexing and searching for resources is described. The techniques of this disclosure are described with reference to the attached figures. In the following description, reference numbers refer to like reference numbers in the attached figures. It should be understood that the attached figures are examples and are provided for purposes of explanation only.

Figure 1:
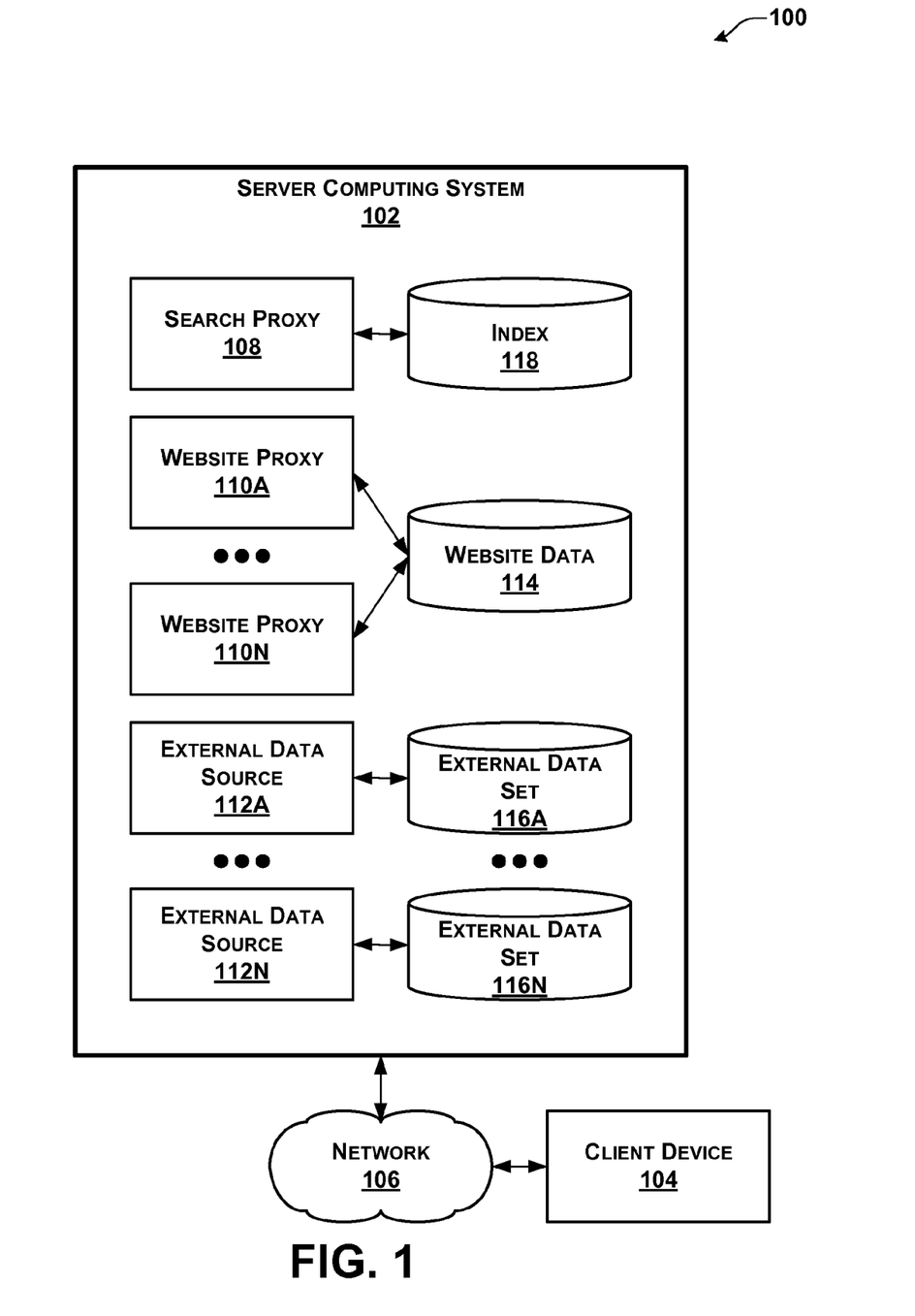
FIG. 1 is a block diagram illustrating an example system for providing web services.

FIG. 1 is a block diagram illustrating an example system 100 for indexing and searching for resources. It should be appreciated that the system 100 is merely an example. For instance, other systems may include more or fewer computing systems than those shown in the example of FIG. 1.

As illustrated in the example of FIG. 1, the system 100 includes a server computing system 102. The server computing system 102 is a computing system. As used in this disclosure, a computing system is a set of one or more physical electronic computing devices. A physical electronic computing device is a physical computing device comprising physical electronic components that interact to perform computing tasks. A physical computing device is a device that performs computing tasks. Physical electronic components are physical entities that affect electrons or fields of electrons in a predictable manner. Example types of electronic components include capacitors, resistors, diodes, transistors, and other types of physical entities that affect electrons or fields of electrons in a manner consistent with the intended function of an electronic computing device. An example physical electronic computing device is described below with reference to FIG. 4.

It should further be noted that, in some implementations, the server computing system 102 hosts one or more virtual computing devices. As used in this disclosure, a virtual machine is a software application that emulates a physical computing device. Consequently, a single one of the physical computing devices in the server farm 102 may behave like two or more separate physical computing devices. As used in this disclosure, the term "computing device" encompasses physical computing devices and virtual machines.

In some instances, a web services provider operates the server computing system 102. As used in this disclosure, a web services provider is an entity that operates information technology infrastructure to provide one or more web services to a plurality of tenants. A tenant is an entity that uses web services provided by a web services provider.

In addition, the system 100 includes a client device 104. The client device 104 may be a wide variety of different types of computing systems. For example, the client device 104 may be a personal computer, a lap top computer, a cellular telephone, a smartphone, a watch, a video game console, a netbook, a personal media player, a device integrated into a vehicle, a television set top box, a network appliance, a server device, a supercomputer, a mainframe computer, or another type of computing system.

A network 106 facilitates communication between the server computing system 102 and the client device 104. The network 106 may be a wide variety of different types of electronic communication networks. For example, the network 106 may be a wide-area network, such as the Internet, a local-area network, a metropolitan-area network, or another type of electronic communication network. The network 106 may include wired and/or wireless data links. A variety of communications protocols may be used in the network 106 including, but not limited to, Ethernet, Transport Control Protocol (TCP), Internet Protocol (IP), Hypertext Transfer Protocol (HTTP), SOAP, remote procedure call protocols, and/or other types of communications protocols.

As used in this disclosure, a computing device provides a service when the computing device performs an action specified by a service definition of the service for each allowable input to the service. In other words, a service is provided by a computing device when the computing device performs actions specified by the service definition of the service for each allowable input to the service. Furthermore, as used in this disclosure, a service definition is a set of allowable inputs and a set of mappings from each of the allowable inputs to particular actions.

Furthermore, as used in this disclosure, an endpoint of a service is an identifiable conceptual object that provides the service. A computing device includes an endpoint of a service when the computing device has been configured to receive input directed by one or more software processes to a conceptual object and has been configured to perform actions specified by the service definition of the service in response to the input. As used in this disclosure, a software process is an instance of a computer program, consisting of one or more threads, that is being sequentially executed by a computer system. In some instances, a single computing device includes a plurality of endpoints of the same service. In various instances, endpoints of services are identified in different ways. For instance, in some instances, endpoints of services are identified by Uniform Resource Identifiers (URIs). In other instances, endpoints of services are identified by Globally Unique Identifiers (GUIDs).

As illustrated in the example of FIG. 1, one or more computing devices at the server computing system 102 host a plurality of website proxies 110A-110N (collectively, "website proxies 110"). Each of the website proxies 110 is an endpoint of a website service. Each of the website proxies 110 is associated with a website in a plurality of websites. Each website in the plurality of websites is hosted by the server computing system 102. As used in this disclosure, a website proxy is associated with a website when the website proxy provides access to the website. As used in this disclosure, a website is a set of web pages that is managed as a unit. As used in this disclosure, a web page is a document rendered by a web browser application.

Each website in the plurality of websites is associated with at least one tenant of the server computing system 102. In some instances, two or more of the websites may be associated with a single tenant. For example, an enterprise may manage a first website for internal use (i.e., an intranet site) and a second website for public use (i.e., a World Wide Web site). A tenant is able to manage at least some aspects of the contents of a website with which the tenant is associated. For example, a tenant associated with a website may be able to change the content of individual web pages in the website, add web pages to the website, delete web pages from the website, and/or perform other activities to manage the website. In general, a tenant is not allowed to manage a website with which the tenant is not associated.

Each of the website proxies 110 is capable of receiving service requests. In different implementations, the website proxies 110 receive service requests in different ways. In a first example implementation, each of the website proxies 110 implements an application programming interface (API) comprising one or more methods. In this first example implementation, the website proxies 110 receive service requests when software processes invoke methods of the API. In a second example implementation, each of the website proxies 110 receives service requests by reading the service requests from a file, port, slot, or other data structure. In this second example, the service requests are deposited in the data structure asynchronously.

In different implementations, the website proxies 110 may receive service requests from different sources. In a first example, the website proxies 110 may receive service requests in the form of HTTP request from the client device 104 via the network 106. In a second example, the website proxies 110 may receive service requests from other service endpoints at the server computing system 102.

As illustrated in the example of FIG. 1, the server computing system 102 stores website data 114. The website data 114 comprises a plurality of website resources. As used in this disclosure, a resource is an identifiable set of data. The website data 114 includes various types of website resources. For example, the website data 114 may include HTML files, extensible markup language (XML) files, database records, image files, video files, audio files, portable document format (PDF) files, common gateway interface (CGI) files, Perl files, Active Server Page (ASP) files, and many other types of resources. Furthermore, the website data 114 may include multiple types of resources.

The plurality of website resources in the website data 114 is partitioned among a plurality of website partitions. In other words, each website resource in the plurality of website resources is in exactly one website partition in the plurality of website partitions. In different implementations, the website resources are partitioned in different ways. In one example implementation, the website data 114 comprises a database table having an entry for each of the website resources. In this first example implementation, the entries in the database table include a field that specifies an identifier of one of the website partitions. In another example implementation, the website resources are stored in folders associated with the website partitions.

Each of the website proxies 110 is associated with a different website partition in the plurality of website partitions. For example, the website proxy 110A is associated with a first website partition in the plurality of website partitions and the website proxy 110N is associated with a second website partition in the plurality of website partitions.

Each of the website proxies 110 only uses website resources in the website partitions associated with the website proxies to process service requests received by the website proxies. For instance, where the website proxy 110A is associated with a first website partition, the website proxy 110A only uses website resources in the first website partition to process service requests received by the website proxy 110A.

In different implementations, the server computing system 102 stores the website data 114 in different ways. In a first example implementation, the server computing system 102 stores the website data 114 in a file system. In a second example implementation, the server computing system 102 stores the website data 114 as a single database. In this second example implementation, storing the website data 114 as a single database may be more efficient than storing website resources used by different ones of the website proxies 110 in separate databases. In this second example, more computational overhead may be required to maintain separate databases storing parts of the website data 114 than to maintain a single database storing all of the website data 114.

As illustrated in the example of FIG. 1, the server computing system 102 stores a plurality of external data sets 116A-116N (collectively, "external data sets 116"). In different implementations, the server computing system 102 stores the external data sets 116 in different ways. In a first example, the server computing system 102 stores one or more of the external data sets 116 as relational databases. In another example, the server computing system 102 stores one or more of the external data sets 116 in file systems.

Each of the external data sets 116 comprises a plurality of external resources. The external resources in the external data sets 116 are external to the website data 114 in the sense that the external resources are not managed as part of any of the websites. Furthermore, the external resources in the external data sets 116 are external to the website data 114 in the sense that the external resources are not directly accessible to the website proxies 110. For instance, the server computing system 102 may store the website data 114 in a first relational database and may store each of the external data sets 116 may be in separate relational databases. The external resources may be a wide variety of different types of resources. For example, one or more of the external data sets 116 may comprise database records. In another example, one or more of the external data sets 116 comprises XML files.

The external resources in the external data sets 116 may contain a wide variety of different types of data. For example, the external resources in the external data set 116A could be database records that store temperature readings for cities around the world. In this example, the external resources in the external data set 116A may be maintained by a meteorological agency. In another example, the external resources in the external data set 116B (not shown) are inventory records for a plurality of enterprises. In a third example, the external resources in the external data set 116C (not shown) contain contact information for employees of one or more enterprises.

The external resources within each of the external data sets 116 are partitioned into a plurality of external partitions. In other words, for each of the external data sets 116, the external resources within the external data set are partitioned among a plurality of external partitions. Depending on how the external resources in each of the external data sets 116 are structured, the external resources may be partitioned among the plurality of external partitions in different ways. For example, if the external resources are records in a database, each of the records may include a field that specifies a value that identifies a partition that contains the record. In another example, if the external resources are files, a separate file may contain a table having entries that associate the files with external partitions.

In some instances, each of the external partitions in each of the external data sets 116 is associated with a different tenant. For example, each of the tenants may be an enterprise. In this example, each of the external resources in the external data set 116A contains employee contact information for employees of each of the tenants. In this example, it may be more efficient to store the employee contact information for each of the tenants in a single relational database than storing the employee contact information of the tenants in separate relational databases. Furthermore, in this example, a given tenant should only be able to access the employee contact information of employees for the given tenant. In this example, each given tenant is associated with an external partition containing only employee contact information for the given tenant.

One or more computing devices at the server computing system 102 host a plurality of external data sources 112A-112N (collectively, "external data sources 112"). The external data sources 112 are endpoints of one or more external data services. Each of the external data sources 112 is associated with one of the external data sets 116. As used in this disclosure, an external data source is associated with an external data set when the external data source provides access to external resources in the external data source. As illustrated in the example of FIG. 1, the external data source 112A is associated with the external data set 116A, the external data source 112N is associated with the external data set 116N, and so on.

Each of the external data sources 112 is associated with a different base external data source identifier. A base external data source identifier is associated with an external data source when the base external data source identifier identifies the external data source. Furthermore, each external partition of the external data sets 116 is associated with an external partition identifier. An external partition identifier is associated with an external partition when the external partition identifies the external partition. The external partition identifiers are relative to the base external data resource identifiers that identify ones of the external data sources 112 through which the external partitions are accessible. For example, "http://external-data-source-1" may be the base external data source identifier of the external data source 112A. In this example, "http://external-data-source-1/partition1" identifies a first external partition of the external data source 112A and "http://external-data-source-1/partition2" identifies a second external partition of the external data source 112A. Furthermore in this example, "http://external-data-source-2" is a base external data source identifier that identifies external data source 112N and "http://external-data-source-2/partition1" is an external partition identifier that identifies a first partition of the external data set 116N. In different implementations, the external partition identifiers are formatted in different ways. For instance, in a first example implementation, the resource identifiers are formatted as uniform resource identifiers (URIs). In this first example, an external partition identifier may comprises a URI that identifies an external data source and that has a parameter that specifies an index partition of the external data source. In a second example implementation, the resource identifiers are formatted as file system paths.

To process some service requests, the website proxies 110 use external resources in one or more of the external data sets 116. Different ones of the website proxies 110 may process service requests using external resources in different ones of the external data sets 116. For example, the website proxy 110A may process service requests using external resources in the external data sets 116A and 116B (not shown). Furthermore, in this example, the website proxy 110N may process service requests using external resources in external data sets 116B (not shown), 116C (not shown), and 116N.

The website proxies 110 may use external resources in a wide variety of ways. In a first example, the website proxy 110A uses external resources to store data submitted to the website proxy 110A through a web page in the website associated with the website proxy 110A. In a second example, the website proxy 110A receives a service request that requests a web page. In this second example, the website data 114 does not store a file that a web browser application can render to present the web page (i.e., a web page file). However, in this second example, the website data 114 stores a web page definition file that specifies how to generate the web page file. In this second example, the web page definition file specifies that the website proxy 110A is to generate the web page file using an external resource in external data set 116A. Thus, in this second example, the website proxy 110A retrieves the web page definition file from the website data 114 and interprets the web page definition file. In this second example, the website proxy 110A, in response to interpreting the web page definition file, sends an external data service request to the external data source 112A requesting the external resource. Subsequently, in this second example, the website proxy 110A receives the external resource from the external data source 112A and uses the external resource to generate the web page file. Finally, in this second example, the website proxy 110A responds to the service request by sending the web page file to a sender of the service request.

Furthermore, as illustrated in the example of FIG. 1, the server computing system 102 stores an index 118. The index 118 comprises a plurality of index entries. Each of the index entries comprises mapping data that maps a term to a resource in an overall set of resources. The overall set of resources includes website resources in the website data 114 and external resources in the external data sets 116. In different implementations, index entries in the index 118 specify resources in the overall set of resources in different ways. For instance, in a first example implementation, index entries in the index 118 specify URIs of resources in the overall set of resources. In a second example implementation, index entries in the index 118 specify GUIDs and/or file system paths of resources in the overall set of resources.

In different implementations, the server computing system 102 may store the index 118 in different ways. For instance, in a first example implementation, the server computing system 102 stores the index 118 as a plurality of relational databases. In this first example, each of the index partitions is stored in a separate one of the relational databases. In a second example implementation, the server computing system 102 stores the index 118 as a single relational database. In this second example, storing the index 118 as a single relational database may incur less computational overhead than storing the index 118 as a plurality of relational databases.

The index entries in the index 118 are partitioned among a plurality of index partitions. In different implementations, the index entries in the index 118 are partitioned among the plurality of index partitions in different ways. For instance, in a first example implementation, each of the index entries in the index 118 is an entry in a relational database. In this first example implementation, each of the index entries includes a field that specifies an index partition to which the index entry belongs. In a second example implementation, index entries in different partitions are stored in different file system folders. In a third example implementation, each of the index entries in the index 118 is an entry in a relational database. In this third example implementation, the index entries belonging to different index partitions are stored in different tables of the relational database.

Each of the index partitions is associated with one or more of the websites. For instance, a first index partition may be associated with a first website and a second index partition may be associated with a second website and a third website. The index entries in an index partition specify resources in the websites associated with the index partition and in ones of the external data sources 112 used by the websites associated with the index partition. In other words, no index entry in a given index partition specifies a resource that is not in a website associated with the given index partition or in an external data source used by a website associated with the given index partition.

The index partitions can be associated with websites in different ways. In a first example, an index partition is associated with each website managed by a given tenant. In a second example, an index partition is associated with a single website managed by a given tenant who manages several of the website proxies 110. In a third example, an index partition is associated with websites managed by a plurality of tenants. In some implementations, the tenants who manage the websites have the power to determine which index partitions are associated with the websites. For instance, a tenant who manages a first website and a second website may choose to associate the first website with a first index partition and the second website with a second index partition or may choose to associate the first website and the second website with a single index partition.

Furthermore, as illustrated in the example of FIG. 1, one or more computing devices at the server computing system 102 host a search proxy 108. The search proxy 108 uses the index 118 to process query requests received from the website proxies 110. A query request is a service request for a list of resources that contain at least some query terms. For example, a query request may request a list of resources that contain the query terms "snow" and "shovel."

In different instances, the website proxies 110 send the query requests to the search proxy 108 in response to different types of service requests. For example, the website proxy 110A is associated with a website containing a web page having a feature that allows users to search for web pages in the website that contain at least some query terms. In this example, the user enters query terms in to the feature and submits the query terms as parameter to a form processing resource in the website. Furthermore, in this example, when the website proxy 110A receives the query terms, the website proxy 110A sends a query request to the search proxy 108.

As described below in detail with reference to FIG. 3, when the search proxy 108 receives a query request from a given one of the website proxies 110, the search proxy 108 identifies a target index partition among the plurality of index partitions in the index 118. The target index partition is associated with a given website. The given website is associated with the given one of the website proxies 110. The search proxy 108 then uses the index entries in the target index partition to identify a relevant set of resources. The relevant set of resources comprises resources that include at least some of the query terms in the query request. After identifying the relevant set of resources, the search proxy 108 provides a list of relevant resource identifiers to the given website proxy. The list of relevant resource identifiers includes resource identifiers that identify each resource in the relevant set of resources. In some instances, the given one of the websites proxies 110 may then use the list of relevant resource identifiers to automatically generate a web page containing references to resources in the relevant set of resources.

The index entries in the target index partition only specify resources in the website proxies associated with the target index partition and external data sources used by the website proxies associated with the target index partition. Consequently, the relevant set of resources only contains resources in the websites associated with the target index partition and the external data sources used by the website proxies associated with the target index partition. In other words, the relevant set of resources does not contain any resources in websites not associated with the target index partition and does not contain any external resources in external data sources not used by the website associated with the target index partition.

In addition to processing query requests, the search proxy 108 automatically generates the index 118. To generate the index 118, the search proxy 108 systematically retrieves each of the web pages in the websites. When the search proxy 108 retrieves a web page in a website, the search proxy 108 updates the index 118 such that an index partition associated with the website includes index entries that map terms in the web page to the web page. The search proxy 108 may generate new index entries or modify existing index entries to update the index 118 such that an index partition associated with the website includes index entries.

Furthermore, for each of the websites, the search proxy 108 obtains a set of external partition identifiers for the website. In one example implementation, the search proxy 108 obtains the set of external partition identifiers for a website by invoking a method in an application programming interface (API) implemented by a website proxy that represents the website. Each external partition identifier in the set of external partition identifiers identifies an external partition used by the website. As used in this disclosure, a website is said to use an external partition when a website proxy associated with the website uses external resources in the external partition to process service requests received by the website proxy.

Next, the search proxy 108 selects a given un-indexed external partition identifier from the set of external partition identifiers. The given un-indexed external partition identifier identifies an external partition comprising a given set of external resources. An index partition associated with the website does not contain index entries that map terms to external resources in the given set of external resources. After selecting the given un-indexed external partition identifier, the search proxy 108 receives each of the external resources in the given set of external resources. For each of the external resources in the given set of external resources, the search proxy 108 updates the index 118 such that the index partition associated with the website includes index entries that map terms in the external resource to the external resource.

In some instances, multiple websites use the same external partitions. Furthermore, in some instances, multiple websites are associated with a single index partition. The search proxy 108 only retrieves the external resources in external partitions identified by un-indexed external partition identifiers. Consequently, when two or more websites use the same external partition and the two or more websites are associated with the same index partition, the search proxy 108 does not generate duplicate index entries in the index 118 specifying external resources in the external partition for each of the websites. In other words, the search proxy 108 does not need to index a given external partition more than once per index partition.

Figure 2:
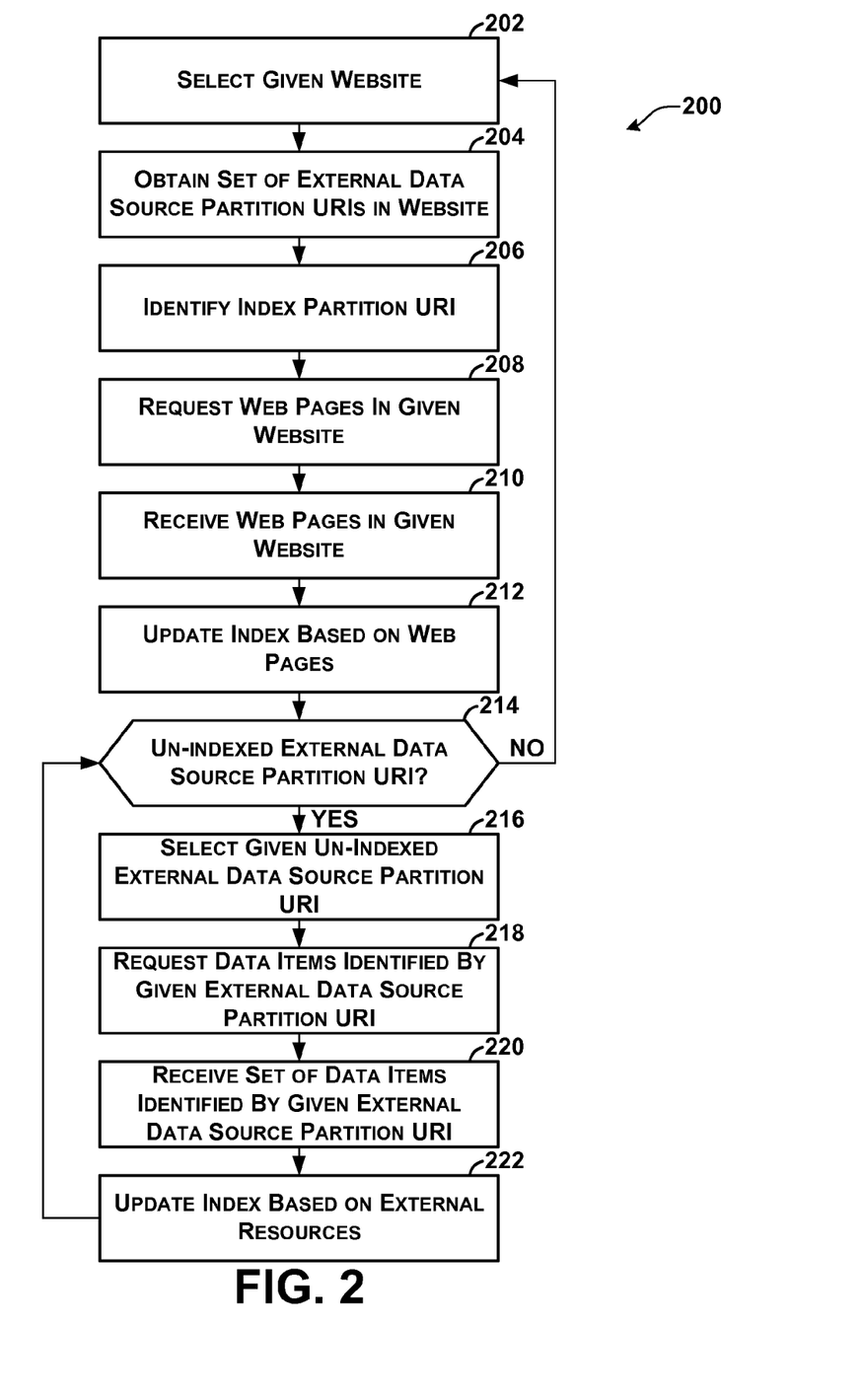
FIG. 2 is a flowchart illustrating an example operation of a search service to automatically generate an index.

FIG. 2 is a flowchart illustrating an example operation 200 of the search proxy 108 to automatically generate the index 118. It should be appreciated that the operation 200 is an example provided for purposes of explanation only. In other implementations, operations to automatically generate the index 118 may involve more or fewer steps, or may involve the steps of the operation 200 in a different order. Furthermore, the operation 200 is explained with reference to FIG. 1. It should be appreciated that other operations to automatically generate the index 118 may be used in different systems and in computing systems having components other than those illustrated in the example of FIG. 1.

As illustrated in the example of FIG. 2, the operation 200 begins when the search proxy 108 automatically selects a given website from among the plurality of websites (202). In different implementations, the search proxy 108 selects the given website from among the plurality of websites in different ways. For instance, in a first example implementation, the search proxy 108 selects the given website from among the plurality of websites in a random fashion. In a second example implementation, the search proxy 108 selects the least recently selected website in the plurality of websites as the given website.

After selecting the given website from among the plurality of websites, the search proxy 108 automatically obtains a set of external partition identifiers for the given website (204). Each external partition identifier in the set of external partition identifiers identifying an external partition of an external data source used by the given website.

In different implementations, the search proxy 108 automatically obtains the set of external partition identifiers in different ways. In a first example implementation, the search proxy 108 invokes a method of a given website proxy associated with the given website. In this first example implementation, the method, when invoked, returns to the search proxy 108 a set of external partition identifiers. Each external partition identifier in the set of external partition identifiers identifies an external partition of an external data source used by the given website.

After obtaining the set of external partition identifiers, the search proxy 108 automatically identifies an index partition identifier among the set of external partition identifiers (206). The index partition identifier identifies the search service and identifies a given index partition in the index 118 used by the given website. The set of external partition identifiers includes the index partition identifier because the given website uses the search service as a source of external data. For instance, the given website uses the index 118 to generate web pages containing lists of resources that satisfy query requests submitted through the given website.

Next, the search proxy 108 automatically requests each web page in the given website (208). In different implementations, the search proxy 108 requests each web page in the given website in different ways. For instance, in a first example implementation, the website proxy associated with the given website implements an API that includes a first method that, when invoked, returns a list of references to each of the web pages in the given website. In this first example, the API also includes a second method that, when invoked, returns a copy of a web page in the given website. In this first example implementation, the search proxy 108 invokes the first method and receives the list. Furthermore, in this first example implementation, the search proxy 108 requests each web page in the given website by invoking the second method for each web page indicated in the list. In a second example implementation, the search proxy 108 follows hyperlinks in web pages in the given website to retrieve each web page in the given website.

After the search proxy 108 has requested each web page in the given website, the search proxy 108 receives each web page in the given website (210). It should be appreciated that in different implementations, the search proxy 108 may receive the web pages in the given website in response to separate requests for the web pages or in response to a single request for each of the web pages in the given website.

When the search proxy 108 receives the web pages in the given website, the search proxy 108 automatically updates the index 118 based on the web pages in the given website (212). The search proxy 108 updates the index 118 such that the given index partition includes index entries that map a set of terms in the web pages to web pages in the given website that contain the set of terms. Otherwise stated, for each term in each given web page in the given website, the search proxy 108 updates the index 118 such that the given index partition includes a given index entry, the given index entry mapping a term in the given web page to the given web page.

After updating the index 118 based on the web pages in the given website, the search proxy 108 automatically determines whether the set of external partition identifiers includes one or more un-indexed external partition identifiers (214). The index partition identifier is not considered to be an un-indexed data source partition identifier. In different implementations, the search proxy 108 determines whether the set of external data source identifiers includes an un-indexed external partition identifier in a variety of ways. For example, the search proxy 108 may scan through the index 118 to determine whether the index 118 includes index entries associated with each external partition identifier in the set of external partition identifiers. In another example, the search proxy 108 maintains a table containing each external partition identifier.

In response to determining that the set of external partition identifiers includes one or more un-indexed external partition identifiers ("YES" of 214), the search proxy 108 automatically selects a given un-indexed external partition identifier from among the set of external partition identifiers (216). In different implementations, the search proxy 108 selects a given un-indexed external partition identifier from among the set of external partition identifiers in different ways. For example, the search proxy 108 may select the given un-indexed external partition identifier at random from among the set of external partition identifiers. In another example, the search proxy 108 selects the given un-indexed external partition identifier from among the set of external partition identifiers based on whether the search proxy 108 already has an open connection to the external data source identified by the given external partition identifier.

After selecting the given un-indexed external partition identifier from among the set of un-indexed external partition identifiers, the search proxy 108 automatically sends an external data service request to a given external data source (218). The given external data source is the external data source identified by the given un-indexed external partition identifier. In different implementations, the search proxy 108 sends the external data service request to the given external data source in different ways. In a first example, the search proxy 108 sends the external data service request to the given external data source using a remote procedure call protocol. In a second example, the search proxy 108 sends the external data service request to the given external data source using inter-process communication. In a third example, the search proxy 108 sends the external data service request to the given external data source using an asynchronous message-passing protocol.

Subsequently, the search proxy 108 receives a set of external resources (220). The set of external resources are external resources that are in a given external partition of the given external data source. The given un-indexed external partition identifier identifies the given external partition of the given external data source.

In different implementations, the search proxy 108 receives the set of external resources in different ways. In a first example implementation, the search proxy 108 receives the set of external resources in an external data service response responsive to the service request. In a second example implementation, the search proxy 108 receives a set of external resource identifiers in an external data service response responsive to the service request. In this second example implementation, the set of external resource identifiers identify each external resource in the set of external resources. Subsequently, in this second example implementation, the search proxy 108 sends one or more subsidiary service requests to the given external data source. Each of these subsidiary service requests is a request for an external resource identified by one or more of the external resource identifiers. The given external data source responds to the subsidiary service requests by sending copies of the external resources to the search proxy 108. Thus, in this second example implementation, the search proxy 108 receives the set of external resources in response to sending the one or more subsidiary service requests to the given external data source.

After receiving the set of external resources, the search proxy 108 automatically updates the index 118 based on the set of external resources (222). The search proxy 108 updates the index 118 such that the given index partition includes index entries that map a set of terms to ones of the external resources that contain the set of terms. Otherwise stated, for each given external resource in the set of external resources, the search proxy 108 updates the index 118 such that the index 118 includes a given index entry, the given index entry in the index partition identified by the index partition identifier, the given index entry mapping a given term in the given external resource to the given data item. For example, the given external resource includes the term "snowshoe." In this example, the search proxy 108 updates the index 118 such that the index 118 includes an index entry that is associated with the given partition of the given external data source and that maps the term "snowshoe" to the given external resource.

When the search proxy 108 updates the index 118, the search proxy 108 may generate one or more new index entries and/or modify one or more existing index entries. For example, a first data item includes the terms "snowshoe" and "skis." In this example, an index partition in the index 118 already contains a first index entry that maps the term "skis" to a second data item, but does not contain an index entry that maps the term "snowshoe" to any data item. In this example, the search proxy 108 modifies the first index entry such that the first index entry maps the term "skis" to the first data item and the second data item. Furthermore, in this example, the search proxy 108 generates in the index partition a new index entry that maps the term "snowshoe" to the first data item.

It should be appreciated that in some implementations, the search proxy 108 does not receive each external resource in the set of external resources before updating the index 118. For example, the search proxy 108 sends individual subsidiary service requests to the given external data source requesting individual external resources identified by the set of external resource identifiers. In this example, the search proxy 108 updates the index 118 based on an individual external resource before sending a next one of the subsidiary service requests. After the search proxy 108 has updated the index 118 for each external resource in the set of external resources, the given un-indexed external partition identifier is deemed to be an indexed external partition identifier.

When the search proxy 108 has updated the index 118 for each external resource in the set of external resources, the search proxy 108 loops back and again determines whether the set of external partition identifiers includes one or more un-indexed external partition identifiers (214). The search proxy 108 continues to perform the steps 214-222 as long as the set of external partition identifiers includes one or more un-indexed external partition identifiers.

On the other hand, if the search proxy 108 determines that the set of external partition identifiers does not include any un-indexed external partition identifiers ("NO" of 214), the search proxy 108 has completed indexing the external data sources of the website. Accordingly, if the search proxy 108 determines that the set of external partition identifiers does not include any un-indexed external partition identifiers ("NO" of 214), the search proxy 108 loops back and again automatically selects a website in the plurality of websites (202). In this way, the search proxy 108 repeats the operation 200 for a different website in the plurality of websites. In a first example implementation, the search proxy 108 continuously performs the operation 200 and may thereby ensure that the index 118 is current. In a second example implementation, the search proxy 108 only performs the operation 200 once for each website in the plurality of websites. In this second example implementation, the search proxy 108 then incrementally updates the index 118 as changes are made to the websites and the external data sources.

Figure 3:
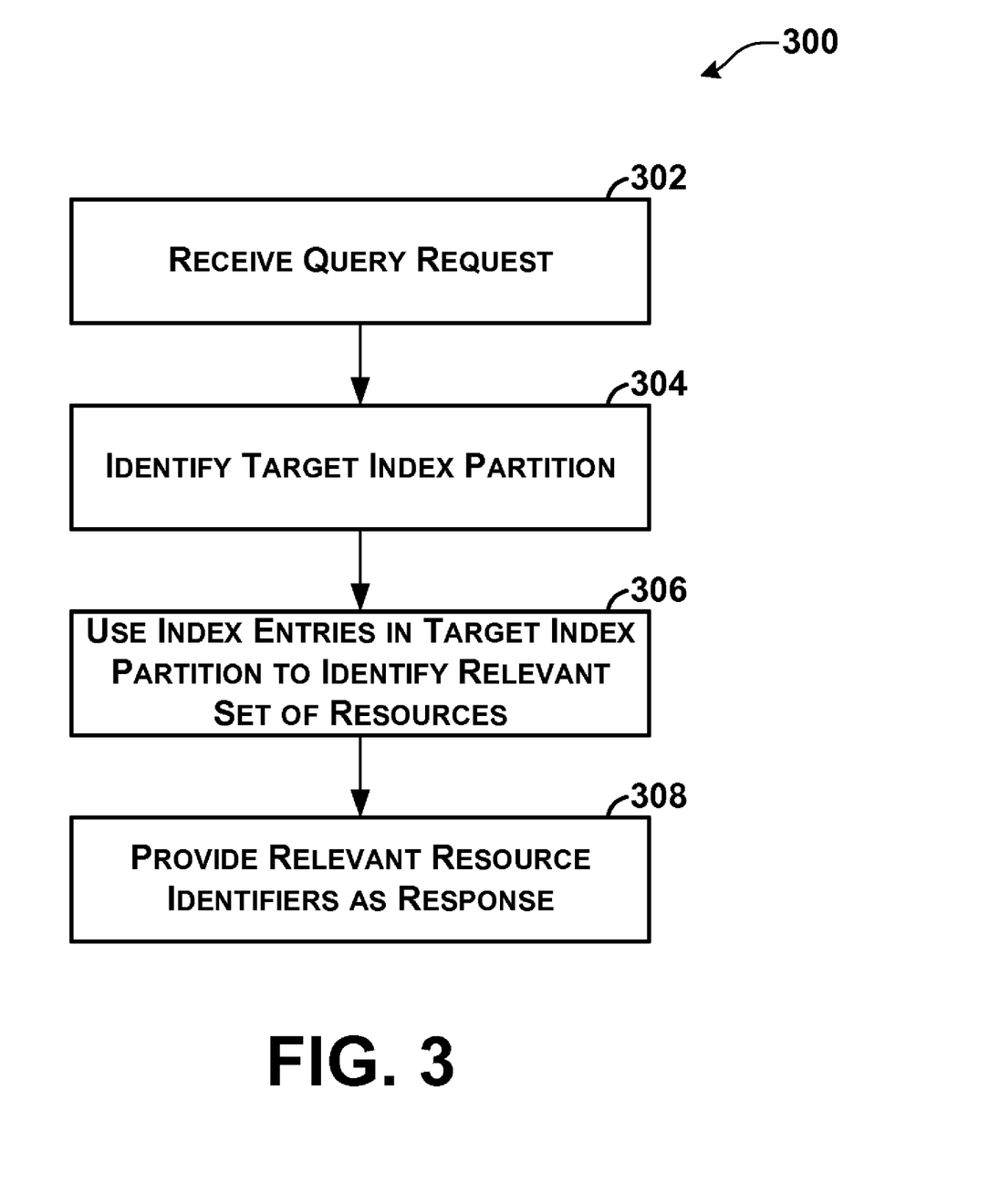
FIG. 3 is a flowchart illustrating an example operation of the search service to process a query request.

FIG. 3 is a flowchart illustrating an example operation 300 of the search proxy 108 to process a query request. It should be appreciated that the operation 300 is an example provided for purposes of explanation only. In other implementations, operations to process a query request may involve more or fewer steps, or may involve the steps of the operation 300 in a different order. Furthermore, the operation 300 is explained with reference to FIG. 1. It should be appreciated that other operations to process a query request may be used in different systems and in computing systems having components other than those illustrated in the example of FIG. 1.

As illustrated in the example of FIG. 3, the operation 300 starts when the search proxy 108 receives a query request from a client (302). In different implementations, the search proxy 108 receives the query request in different ways. In a first example implementation, the search proxy 108 receives the query request through a remote procedure call protocol. In a second example implementation, the search proxy 108 receives the query request through inter-process communication.

The query request specifies one or more query terms. The query request is a request for data items that contain at least some of the query terms. In other words, a data item satisfies the query request when the data item includes at least some of the one or more query terms. For example, if the query request specifies the query term "snowshoe," a data item satisfies the query request when the data item includes the term "snowshoe." In some implementations, a data item satisfies the query request when the data item does not include all of the query terms. For instance, if the query request specifies the query terms "snowboard" and "alpine," a data item may satisfy the query request when the data item includes the term "snowboard," but not the term "alpine."

In addition to specifying one or more query terms, the query request includes data that indicates a given website. In different implementations, the query request includes different types of data that indicate the given website. In a first example implementation, the query request includes a resource identifier that identifies the given website. In a second example implementation, the query request data includes a GUID that identifies the given website. In a third example implementation, the query request includes a tenant identifier that identifies a tenant. In this third example implementation, the search proxy 108 may include a mapping from tenant identifiers to websites.

Furthermore, in different implementations, the search proxy 108 may receive the query request from different types of clients. In a first example implementation, the search proxy 108 receives the query request from the given website proxy. The given website proxy uses data in the given partition of the website data 114 to provide access a given website. In this first example, the given website proxy may send the query request to the search proxy in response to receiving a service request from the client device 104. In a second example implementation, the search proxy 108 receives the query request directly from the client device 104.

In response to receiving the query request, the search proxy 108 automatically identifies a target index partition (304). The target index partition is an index partition of the index 118. The target index partition is associated with the given website. In different implementations, the search proxy 108 identifies the target partition in different ways. In a first example implementation, the search proxy 108 stores a table containing entries that map website to partitions of the index 118. In a second example implementation, the search proxy 108 sends a service request to a proxy for a partition mapping service. The service request includes an identifier that identifies the given website. In this second example, the partition mapping service sends a service response to the search proxy 108. The service response, in this second example implementation, specifies an identifier of the target index partition.

After identifying the target index partition, the search proxy 108 automatically uses index entries in the target index partition to identify a relevant set of resources (306). The relevant set of resources comprises resources that satisfy the query request. In other words, each of the relevant resources contains at least some of the query terms. The resources may include external resources or resources in the given website.

In different implementations, the search proxy 108 uses index entries in the target index partition to identify the relevant set of resources in different ways. In a first example implementation, the search proxy 108 first identifies index entries in the target index partition that specify individual ones of the query terms. The search proxy 108 does not identify index entries that specify the query terms, but that are not in the target index partition. For instance, the query terms may include the term "bobsled." Furthermore, in this instance, the index 118 includes a first index entry in the target index partition that maps the term "bobsled" to a first set of data items and includes a second index entry not in the target index partition that maps the term "bobsled" to a second set of data item. In this example, the search proxy 108 identifies the first index entry, but not the second index entry. In this first example implementation, after identifying index entries in the target index partition that specify individual ones of the query terms, the search proxy 108 identifies the relevant set of resources as the intersection of each of the sets of resources specified by the identified index entries. For example, if a first identified index entry maps a query term to resources A, B, and C and a second identified index entry maps the query term to resources B, C, and D, the relevant set of resources includes resources B and C.

The relevant set of resources may contain zero or more resources. For instance, where the target index partition does not contain any index entries that map the query terms to data items, the relevant set of resources contains zero resources. In another instances, the target index partition may contain a plurality of index entries that map query terms to resources, but none of the resources are specified by each index entry in the plurality of index entries.

After identifying the relevant set of resources, the search proxy 108 automatically provides relevant resource identifiers to the client as a response to the query request (308). The relevant resource identifiers identify the resources in the relevant set of resources. In different implementations, the search proxy 108 provides the relevant resource identifiers to the sender of the query request in different ways. In a first example implementation, the search proxy 108 provides the relevant resource identifiers to the sender of the query request in a SOAP response document. In a second example implementation, the search proxy 108 provides the relevant resource identifiers to the sender of the query request as a memory pointer to a data structure.

Figure 4:
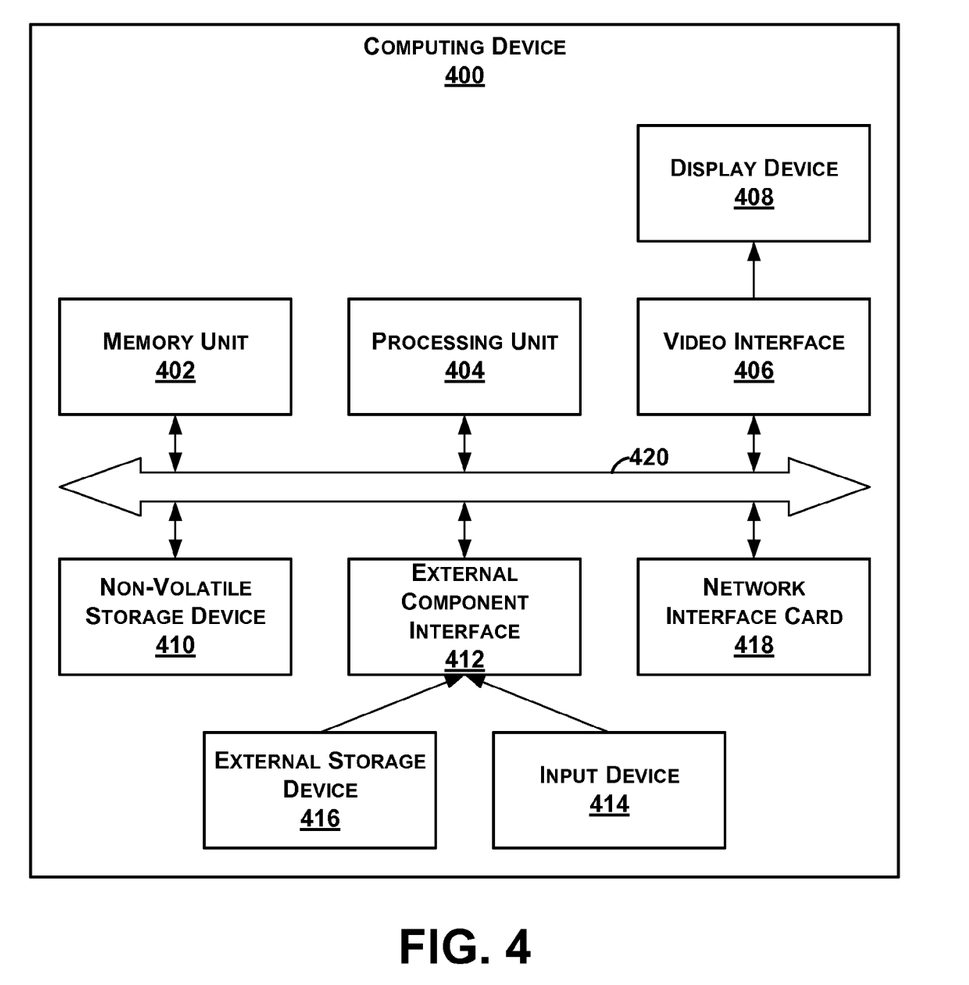
FIG. 4 is a block diagram illustrating example hardware components of a physical electronic computing device.

FIG. 4 is a block diagram illustrating example physical components of a physical computing device 400. In some instances, the server computing system 102 comprises one or more physical computing device of the type illustrated in the example of FIG. 4. Furthermore, in some instances, the client device 104 is a physical computing device of the type illustrated in the example of FIG. 4.

As illustrated in the example of FIG. 4, the physical computing device 400 comprises a memory unit 402. The memory unit 402 is a computer-readable data storage medium capable of storing data and/or instructions. The memory unit 402 may be a variety of different types of computer-readable storage media including, but not limited to, dynamic random access memory (DRAM), double data rate synchronous dynamic random access memory (DDR SDRAM), reduced latency DRAM, DDR2 SDRAM, DDR3 SDRAM, Rambus RAM, or other types of computer-readable storage media.

In addition, the physical computing device 400 comprises a processing unit 404. As mentioned above, a processing unit is a set of one or more physical electronic integrated circuits that are capable of executing instructions. In a first example, the processing unit 404 may execute software instructions that cause the physical computing device 400 to provide specific functionality. In this first example, the processing unit 404 may be implemented as one or more processing cores and/or as one or more separate microprocessors. For instance, in this first example, the processing unit 404 may be implemented as one or more Intel Core 2 microprocessors. The processing unit 404 may be capable of executing instructions in an instruction set, such as the x86 instruction set, the POWER instruction set, a RISC instruction set, the SPARC instruction set, the IA-64 instruction set, the MIPS instruction set, or another instruction set. In a second example, the processing unit 404 may be implemented as an ASIC that provides specific functionality. In a third example, the processing unit 404 may provide specific functionality by using an ASIC and by executing software instructions.

The physical computing device 400 also comprises a video interface 406. The video interface 406 enables the physical computing device 400 to output video information to a display device 408. The display device 408 may be a variety of different types of display devices. For instance, the display device 408 may be a cathode-ray tube display, an LCD display panel, a plasma screen display panel, a touch-sensitive display panel, a LED array, or another type of display device.

In addition, the physical computing device 400 includes a non-volatile storage device 410. The non-volatile storage device 410 is a computer-readable data storage medium that is capable of storing data and/or instructions. The non-volatile storage device 410 may be a variety of different types of non-volatile storage devices. For example, the non-volatile storage device 410 may be one or more hard disk drives, magnetic tape drives, CD-ROM drives, DVD-ROM drives, Blu-Ray disc drives, or other types of non-volatile storage devices.

The physical computing device 400 also includes an external component interface 412 that enables the physical computing device 400 to communicate with external components. As illustrated in the example of FIG. 4, the external component interface 412 enables the physical computing device 400 to communicate with an input device 414 and an external storage device 416. In one implementation of the physical computing device 400, the external component interface 412 is a Universal Serial Bus (USB) interface. In other implementations of the physical computing device 400, the physical computing device 400 may include another type of interface that enables the physical computing device 400 to communicate with input devices and/or output devices. For instance, the physical computing device 400 may include a PS/2 interface. The input device 414 may be a variety of different types of devices including, but not limited to, keyboards, mice, trackballs, stylus input devices, touch pads, touch-sensitive display screens, or other types of input devices. The external storage device 416 may be a variety of different types of computer-readable data storage media including magnetic tape, flash memory modules, magnetic disk drives, optical disc drives, and other computer-readable data storage media.

In addition, the physical computing device 400 includes a network interface card 418 that enables the physical computing device 400 to send data to and receive data from an electronic communication network. The network interface card 418 may be a variety of different types of network interface. For example, the network interface card 418 may be an Ethernet interface, a token-ring network interface, a fiber optic network interface, a wireless network interface (e.g., WiFi, WiMax, etc.), or another type of network interface.

The physical computing device 400 also includes a communications medium 420. The communications medium 420 facilitates communication among the various components of the physical computing device 400. The communications medium 420 may comprise one or more different types of communications media including, but not limited to, a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computer System Interface (SCSI) interface, or another type of communications medium.

The physical computing device 400 includes several computer-readable data storage media (i.e., the memory unit 402, the non-volatile storage device 410, and the external storage device 416). Together, these computer-readable storage media may constitute a single data storage system. As discussed above, a data storage system is a set of one or more computer-readable data storage mediums. This data storage system may store instructions executable by the processing unit 404. Activities described in the above description may result from the execution of the instructions stored on this data storage system. Thus, when this description says that a particular logical module performs a particular activity, such a statement may be interpreted to mean that instructions of the logical module, when executed by the processing unit 404, cause the physical computing device 400 to perform the activity. In other words, when this description says that a particular logical module performs a particular activity, a reader may interpret such a statement to mean that the instructions configure the physical computing device 400 such that the physical computing device 400 performs the particular activity.

The techniques of this disclosure may be realized in many ways. For example, the techniques of this disclosure may be realized as a method for indexing and searching for resources. The method comprises storing, by a computing system, an index comprising a plurality of index entries. The index entries are partitioned among a plurality of index partitions. Each index partition in the plurality of index partitions is associated with a website in a plurality of websites. Furthermore, for each given website in the plurality of websites, the method comprises:

Automatically updating, by the computing system, the index such that a given index partition in the plurality of index partitions comprises index entries that map terms in a first set of terms to web pages in the given website that contain terms in the first set of terms, the given website associated with the given index partition.

Automatically obtaining, by the computing system, a set of external partition identifiers. Each external partition identifier in the set of external partition identifiers identifies external partitions of external data sources used by the given website.

For each given external partition identifier in the set of external partition identifiers, automatically updating, by the computing system, the index such that the given index partition comprises index entries that map terms in a second set of terms to external resources in the given set of external resources that contain terms in the second set of terms. A given external partition identified by the given external partition identifier containing the given set of external resources.

The method also comprises receiving, by the computing system, a query request from a client, the query request specifying a query term. The query request indicates a target website. Furthermore, in response to receiving the query request, the method comprises:

Automatically identifying, by the computing system, a target index partition in the plurality of index partitions, the target website associated with the target index partition.

Automatically using, by the computing system, index entries in the target index partition to identify a relevant set of resources. Each resource in the relevant set of resources contains the query term.

Providing, by the computing system, a relevant set of resource identifiers to the client. Each resource identifier in the relevant set of resource identifiers identifies a resource in the relevant set of resources.

In another example, the techniques of this disclosure may be realized as a computing system comprising a data storage system. The data storage system storing an index comprising a plurality of index entries. The index entries are partitioned among a plurality of index partitions. Each index partition in the plurality of index partitions is associated with a website in a plurality of websites. The data storage system also stores a plurality of external data sets. Each external data set in the plurality of external data sets comprises external resources. The external resources within each of the external data sets are partitioned among pluralities of external partitions. Furthermore, the data storage system stores a set of computer-executable instructions. The computing system also comprises a processing unit. The set of computer-executable instructions, when executed by the processing unit, causes the computing system to host a plurality of website proxies. Each website proxy in the plurality of website proxies is associated with a website in the plurality of websites. The computer executable instructions, when executed by the processing unit, also cause the computing system to host a plurality of external data sources. Each external data source in the plurality of external data sources is associated with a different external data set in the plurality of external data sets. Furthermore, the computer executable instructions, when executed by the processing unit, cause the computing system to host a search proxy that for each given website in the plurality of websites:

Automatically updates the index such that a given index partition in the plurality of index partitions comprises index entries that map terms in a first set of terms to web pages in the given website that contain terms in the first set of terms. The given website is associated with the given index partition.

Automatically obtains a set of external partition identifiers. Each external partition identifier in the set of external partition identifiers identifies external partitions of a given set of external data sources. Each external data source in the given set of external data sources is in the plurality of external data sources. Each external data source in the given set of external data sources is used by the given website.

For each given external partition identifier in the set of external partition identifiers, automatically updates the index such that the given index partition comprises index entries that map a second set of terms to external resources in the external partition identified by the given external partition identifier that contain terms in the second set of terms.

The search proxy also receives a query request from a querying website proxy in the plurality of website proxies. The query request specifies a query term. The querying website proxy is associated with a target website in the plurality of websites. In response to receiving the query request, the search proxy:

Automatically identifies a target index partition in the plurality of index partitions. The target website is associated with the target index partition.

Automatically uses index entries in the target index partition to identify a relevant set of resources. Each resource in the relevant set of resources contains the query term.

Provides a relevant set of resource identifiers to the given website proxy. Each resource identifier in the relevant set of resource identifiers identifies a resource in the relevant set of resources.

In another example, the techniques of this disclosure may be realized as a data storage system comprising at least one computer-readable data storage medium. The at least one computer-readable data storage medium stores an index comprising a plurality of index entries, the index entries partitioned among a plurality of index partitions. Each index partition in the plurality of index partitions is associated with a website in a plurality of websites. The at least one computer-readable data storage medium also storing a website database comprising a plurality of website resources. The website resources partitioned among a plurality of website partitions. Furthermore, the at least one computer-readable data storage medium also storing a plurality of external data sets. Each external data set in the plurality of external data sets comprising external resources. The external resources within each of the external data sets partitioned among a plurality of external partitions. In addition, the at least one computer-readable data storage medium storing a set of computer-executable instructions that, when executed by a processing unit of a computing system, cause the computing system to host a plurality of website proxies. Each website proxy in the plurality of website proxies providing access to a different website in a plurality of websites. Each website proxy in the plurality of website proxies implementing an API that includes a method. The computer-executable instructions, when executed by the processing unit, cause the computing system to host a plurality of external data sources. Each external data source in the plurality of external data sources provides access to a different external data set in the plurality of external data sets. In addition, the computer-executable instructions, when executed by the processing unit, cause the computing system to host a search proxy that for each given website in the plurality of websites:

Automatically updates the index such that a given index partition in the plurality of index partitions comprises index entries that map terms in a first set of terms to web pages in the given website that contain terms in the first set of terms. The given website associated with the given index partition.

Sends a service request to a given website proxy in the plurality of website proxies by invoking the method of the API implemented by the given website proxy. The given website proxy associated with the given website.

Receives a service response from the given website proxy. The service response comprises a set of external partition identifiers. Each external partition identifier in the set of external partition identifiers identifies external partitions of a given set of external data sources. Each external data source in the given set of external data sources is in the plurality of external data sources. Each external data source in the given set of external data sources is used the by given website.

For each given external partition identifier in the set of external partition identifiers, the search proxy:
Sends an external data service request to a given external data source in the plurality of external data sources. The given external data source is identified by the given external partition identifier. The external data service request specifies the external partition identified by the given external partition identifier.
Receives an external data service response. The external data service response is responsive to the external data service request. The external data service response includes external resources in the external partition identified by the given external partition identifier.
Automatically updates the index such that the given index partition comprises index entries that map a second set of terms to the external resources in the external partition identified by the given external partition identifier that contain terms in the second set of terms.

The search proxy also receives a query request from a querying website proxy in the plurality of website proxies. The query request specifies a query term. The querying website proxy is associated with a target website in the plurality of websites. In response to receiving the query request, the search proxy automatically identifies a target index partition in the plurality of index partitions. The target website is associated with the target index partition. The search proxy also automatically uses index entries in the target index partition to identify a relevant set of resources. Each resource in the relevant set of resources contains the query term. Furthermore, the search proxy provides a set of relevant resource identifiers to the querying website proxy. Each resource identifier in the relevant set of resource identifiers identifies a resource in the relevant set of resources. The querying website proxy sends the query request to the search proxy in response to receiving a request from a client device for a web page containing a list of web pages that contain the query term. The querying website proxy also uses the relevant set of resource identifiers to generate a web page containing the list of web pages that contain the query term.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method for indexing and searching for resources, the method comprising:
storing, by a computing system, an index comprising a plurality of index entries, the index entries partitioned among a plurality of index partitions, each index partition in the plurality of index partitions associated with at least one website in a plurality of websites;
for each given website in the plurality of websites:
automatically updating, by the computing system, the index such that a given index partition in the plurality of index partitions comprises index entries that map terms in a first set of terms to web pages in the given website that contain terms in the first set of terms, the given website associated with the given index partition;
automatically obtaining, by the computing system, a set of external partition identifiers, each external partition identifier in the set of external partition identifiers identifying external partitions of external data sources used by the given website, wherein automatically obtaining the set of external partition identifiers comprises:
sending, by the computing system, a service request to a website proxy associated with the given website; and
receiving, at the computing system, a service response from the website proxy, the service response comprising the set of external partition identifiers wherein the website proxy implements an application programming interface (API) that includes a first method and a second method and wherein sending the service request comprises, invoking, by a search proxy in the computing system, the first method and the second method, wherein invoking the first method comprises returning a list of references to each of the plurality of web pages in the given website, wherein invoking the second method comprises returning a copy of each of the plurality of web pages in the given website indicated in the list of references; and
for each given external partition identifier in the set of external partition identifiers, automatically updating, by the computing system, the index such that the given index partition comprises index entries that map terms in a second set of terms to external resources in the given set of external resources that contain terms in the second set of terms, a given external partition identified by the given external partition identifier containing the given set of external resources;
receiving, by the computing system, a query request from a client, the query request specifying a query term, the query request indicating a target website; and
in response to receiving the query request:
automatically identifying, by the computing system, a target index partition in the plurality of index partitions, the target website associated with the target index partition;
automatically using, by the computing system, index entries in the target index partition to identify a relevant set of resources, each resource in the relevant set of resources containing the query term; and
providing, by the computing system, a relevant set of resource identifiers to the client, each resource identifier in the relevant set of resource identifiers identifying a resource in the relevant set of resources.

2. The method of claim 1, wherein the method further comprises:
for each given web page in the given website:
automatically sending, by the computing system, an additional service request to the website proxy, the additional service request for the given webpage; and
automatically receiving, by the computing system, the given web page from the website proxy; and
wherein automatically updating the index such that the given index partition comprises index entries that map terms in the first set of terms to web pages in the given website comprises: automatically updating, by the server computing system, the index such that the given index partition includes an index entry that maps a term in the given web page to the given web page.

3. The method of claim 1,
wherein receiving the query request comprises: receiving, by the computing system, the query request from the website proxy; and
wherein providing the relevant set of resource identifiers comprises: sending, by the computing system, a search service response to the website proxy, the search service response including the relevant set of resource identifiers.

4. The method of claim 1 further comprising:
storing, by the computing system, a database comprising website resources, the website resources partitioned among a plurality of website partitions, each website in the plurality of websites associated with a different website partition in the plurality of website partitions; and
using, by the computing system, website resources in the website partition associated with the given website to process requests for web pages in the given website.

5. The method of claim 1 further comprising:
for each given external partition identifier in the set of external partition identifiers:
sending, by the computing system, an external data service request to a given external data source identified by the given external partition identifier, the external data service request specifying an external partition of the given external data source; and
receiving, by the computing system, an external data service response, the external data service response being responsive to the external data service request, the external data service response including the given external resource.

6. The method of claim 1, wherein automatically updating the index such that the given index partition comprises index entries that map terms in the second set of terms to external resources comprises: automatically adding, by the computing system, a new index entry to the given index partition, the new index entry mapping a given term in the second set of terms to a given external resource that contains the given term, the given external partition containing the given external resource.

7. The method of claim 1, wherein each external partition identifier in the set of external partition identifiers comprises a parameter that specifies an external partition.

8. The method of claim 7, wherein automatically obtaining the set of external partition identifiers comprising automatically obtaining, by the computing system, an index partition identifier, the index partition identifier identifying the given index partition.

9. The method of claim 1, wherein the method further comprises: storing, by the computing system, a set of relational databases, each relational database in the set of relational databases containing external resources of the external data sources used by the given website.

10. The method of claim 1, wherein storing the index comprises storing, by the computing system, the index in a database selected from the group comprising: a relational database and a file system database.

11. The method of claim 1, wherein at least one website in the plurality of websites is managed by a tenant.

12. A computing system comprising:
a data storage system storing:
an index comprising a plurality of index entries, the index entries partitioned among a plurality of index partitions, each index partition in the plurality of index partitions associated with at least one website in a plurality of websites;
a plurality of external data sets, each external data set in the plurality of external data sets comprising external resources, the external resources within each of the external data sets partitioned among pluralities of external partitions; and
a set of computer-executable instructions; and
a processing unit, the set of computer-executable instructions, when executed by the processing unit, causes the computing system to:
host a plurality of website proxies, each website proxy in the plurality of website proxies associated with a website in the plurality of websites;
host a plurality of external data sources, each external data source in the plurality of external data sources associated with a different external data set in the plurality of external data sets; and
host a search proxy that:
for each given website in the plurality of websites:
automatically updates the index such that a given index partition in the plurality of index partitions comprises index entries that map terms in a first set of terms to web pages in the given website that contain terms in the first set of terms, the given website associated with the given index partition;
automatically obtains a set of external partition identifiers, each external partition identifier in the set of external partition identifiers identifying external partitions of a given set of external data sources, each external data source in the given set of external data sources being in the plurality of external data sources, each external data source in the given set of external data sources being used by the given website, wherein the search proxy obtains the set of external partition identifiers by:
sending a service request to the given website proxy, the given website proxy associated with the given website; and
receiving a service response from the given website proxy, the service response comprising the set of external partition identifiers, wherein the given website proxy implements an application programming interface (API) that includes a first method and a second method, wherein the search proxy sends the service request to the given website proxy by invoking the first method and the second method, wherein invoking the first method comprises returning a list of references to each of a plurality of web pages in the given website, wherein invoking the second method comprises returning a copy of one of the plurality of web pages in the given website; and
for each given external partition identifier in the set of external partition identifiers, automatically updates the index such that the given index partition comprises index entries that map a second set of terms to external resources in the external partition identified by the given external partition identifier that contain terms in the second set of terms;
receives a query request from a querying website proxy in the plurality of website proxies, the query request specifying a query term, the querying website proxy associated with a target website in the plurality of websites; and
in response to receiving the query request:

automatically identifies a target index partition in the plurality of index partitions, the target website associated with the target index partition;

automatically uses index entries in the target index partition to identify a relevant set of resources, each resource in the relevant set of resources containing the query term; and provides a relevant set of resource identifiers to the given website proxy, each resource identifier in the relevant set of resource identifiers identifying a resource in the relevant set of resources.

13. The computing system of claim 12, wherein the given website proxy sends the query request to the search proxy in response to receiving a request from a client device for a web page containing a list of web pages that contain the query term; and wherein the given website proxy uses the relevant set of resource identifiers to generate the web page containing the list of web pages that contain the query term.

14. The computing system of claim 12, for each given external partition identifier in the set of external partition identifiers, the search proxy:

sends an external data service request to a given external data source in the plurality of external data sources, the given external data source identified by the given external partition identifier, the external data service request specifying an external partition of the given external data source; and receives an external data service response, the external data service response being responsive to the external data service request, the external data service response including the given external resource.

15. The computing system of claim 12, wherein the search proxy automatically updates the index such that the given index partition comprises index entries that map terms in the second set of term to external resources by automatically modifying an existing index entry already in the given index partition, the existing index entry mapping a given term to an external resource in the external partition identified by the external partition identifier that contains the given term.

16. A data storage system comprising at least one computer-readable data storage medium, the at least one computer-readable data storage medium storing:

an index comprising a plurality of index entries, the index entries partitioned among a plurality of index partitions, each index partition in the plurality of index partitions associated with at least one website in a plurality of websites;

a website database comprising a plurality of website resources, the website resources partitioned among a plurality of website partitions, a plurality of external data sets, each external data set in the plurality of external data sets comprising external resources, the external resources within each of the external data sets partitioned among a plurality of external partitions;

a set of computer-executable instructions that, when executed by a processing unit of a computing system, cause the computing system to:

host a plurality of website proxies, each website proxy in the plurality of website proxies providing access to a different website in a plurality of websites, each website proxy in the plurality of website proxies implementing an application programming interface (API) that includes a first method and a second method;

host a plurality of external data sources, each external data source in the plurality of external data sources providing access to a different external data set in the plurality of external data sets;

host a search proxy that:

for each given website in the plurality of websites:

automatically updates the index such that a given index partition in the plurality of index partitions comprises index entries that map terms in a first set of terms to web pages in the given website that contain terms in the first set of terms, the given website associated with the given index partition;

sends a service request to a given website proxy in the plurality of website proxies by invoking, by search proxy, the first method and the second method of the API implemented by the given website proxy, the given website proxy associated with the given website, wherein invoking the first method comprises returning a list of references to each of a plurality of web pages in the given website, wherein invoking the second method comprises returning a copy of one of the plurality of web pages in the given website; and receives a service response from the given website proxy, the service response comprising a set of external partition identifiers, each external partition identifier in the set of external partition identifiers identifying external partitions of a given set of external data sources, each external data source in the given set of external data sources being in the plurality of external data sources, each external data source in the given set of external data sources being used the by given website; and for each given external partition identifier in the set of external partition identifiers, the search proxy:

sends an external data service request to a given external data source in the plurality of external data sources, the given external data source identified by the given external partition identifier, the external data service request specifying the external partition identified by the given external partition identifier; and receives an external data service response, the external data service response being responsive to the external data service request, the external data service response including external resources in the external partition identified by the given external partition identifier;

automatically updates the index such that the given index partition comprises index entries that map a second set of terms to the external resources in the external partition identified by the given external partition identifier that contain terms in the second set of terms;

receives a query request from a querying website proxy in the plurality of website proxies, the query request specifying a query term, the querying website proxy associated with a target website in the plurality of websites; and in response to receiving the query request:

automatically identifies a target index partition in the plurality of index partitions, the target website associated with the target index partition;

automatically uses index entries in the target index partition to identify a relevant set of resources, each resource in the relevant set of resources containing the query term; and provides a set of relevant resource identifiers to the querying website proxy, each resource identifier in the relevant set of resource identifiers identifying a resource in the relevant set of resources; and wherein the querying website proxy:
sends the query request to the search proxy in response to receiving a request from a client device for a web page containing a list of web pages that contain the query term; and
uses the relevant set of resource identifiers to generate a web page containing the list of web pages that contain the query term.

17. The method of claim 1, wherein sending, by the computing system, a service request to a website proxy associated with the given website comprises sending a separate service request for each of the plurality of web pages.

18. The method of claim 1, wherein sending, by the computing system, a service request to a website proxy associated with the given website comprises sending a single service request for each of the plurality of web pages.

19. The computing system of claim 12, wherein the service request comprises a separate service request for each of the plurality of web pages.

20. The computing system of claim 12, wherein the service request comprises a single service request for each of the plurality of web pages.

* * * * *